United States Patent
Styles et al.

(10) Patent No.: US 10,294,874 B2
(45) Date of Patent: May 21, 2019

(54) METHOD AND SYSTEM FOR IMPROVED DILUTION PURGING

(71) Applicant: Ford Global Technologies, LLC, Dearborn, MI (US)

(72) Inventors: Daniel Joseph Styles, Canton, MI (US); Stanley Larue Bower, Ann Arbor, MI (US); James Alfred Hilditch, Canton, MI (US); Robert Ralph Iorio, Beverly Hills, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 607 days.

(21) Appl. No.: 14/085,676

(22) Filed: Nov. 20, 2013

(65) Prior Publication Data
US 2015/0136076 A1 May 21, 2015

(51) Int. Cl.
*F02D 41/12* (2006.01)
*F02D 17/04* (2006.01)
(Continued)

(52) U.S. Cl.
CPC ........... *F02D 17/04* (2013.01); *B60W 20/00* (2013.01); *F02D 41/0055* (2013.01);
(Continued)

(58) Field of Classification Search
USPC ........ 123/325, 320, 559.1, 562, 564, 568.11, 123/568.15, 568.21; 701/108; 60/278,
(Continued)

(56) References Cited

U.S. PATENT DOCUMENTS

| 6,014,959 | A | 1/2000 | Ma |
| 6,425,365 | B1 * | 7/2002 | Peters ................ B60K 6/442 123/198 DB |

(Continued)

FOREIGN PATENT DOCUMENTS

| CN | 101122262 A | 2/2008 |
| CN | 102358283 A | 2/2012 |

(Continued)

OTHER PUBLICATIONS

Ulrey, Joseph N. et al., "Method and System for Engine Control," U.S. Appl. No. 14/245,940, filed Apr. 4, 2014, 40 pages.
(Continued)

*Primary Examiner* — Lindsay Low
*Assistant Examiner* — Ruben Picon-Feliciano
(74) *Attorney, Agent, or Firm* — Julia Voutyras; McCoy Russell LLP

(57) ABSTRACT

Methods and systems are provided for expediting EGR purging in a hybrid vehicle during transient operations, such as tip-out to lower load conditions. In response to decreasing engine torque demand, engine fueling is disabled and a motor is used to spin the engine unfueled until a desired LP-EGR rate is achieved. Alternatively, engine operation is maintained with EGR disabled until the desired LP-EGR rate is achieved, and the excess engine torque generated is stored in a system battery.

20 Claims, 6 Drawing Sheets

(51) Int. Cl.
  *B60W 20/00* (2016.01)
  *F02D 41/00* (2006.01)
  *F02D 41/04* (2006.01)
  *F02N 11/08* (2006.01)
  *F02M 25/08* (2006.01)
  *F02D 13/02* (2006.01)
  *F02M 26/02* (2016.01)

(52) U.S. Cl.
  CPC ....... *F02D 41/0065* (2013.01); *F02D 41/042* (2013.01); *F02D 13/02* (2013.01); *F02D 2041/0017* (2013.01); *F02D 2250/24* (2013.01); *F02M 25/08* (2013.01); *F02M 26/02* (2016.02); *F02N 11/0844* (2013.01); *Y02T 10/47* (2013.01)

(58) Field of Classification Search
  USPC .............................. 60/280, 298, 605.1, 605.2
  See application file for complete search history.

(56) References Cited

U.S. PATENT DOCUMENTS

| | | | |
|---|---|---|---|
| 6,475,365 | B2 | 11/2002 | Watanabe et al. |
| 6,519,513 | B2* | 2/2003 | Nakagawa ............... B60K 6/48 701/108 |
| 7,689,331 | B2 | 3/2010 | Moran |
| 8,467,927 | B2 | 6/2013 | Thompson et al. |
| 8,515,608 | B2 | 8/2013 | Yamagata |
| 2011/0191010 | A1* | 8/2011 | Russ ...................... F02M 25/07 701/108 |
| 2012/0023937 | A1 | 2/2012 | Styles et al. |
| 2012/0285166 | A1 | 11/2012 | Zahdeh |
| 2013/0018564 | A1* | 1/2013 | Coatesworth ........... F02D 17/04 701/102 |
| 2013/0032127 | A1 | 2/2013 | Jentz et al. |
| 2013/0125544 | A1 | 5/2013 | Mond et al. |
| 2014/0136086 | A1* | 5/2014 | Sasaki ................. F02D 13/0215 701/112 |

FOREIGN PATENT DOCUMENTS

| | | |
|---|---|---|
| CN | 103195548 A | 7/2013 |
| EP | 1932704 B1 | 10/2011 |
| WO | 2013076217 A2 | 5/2013 |

OTHER PUBLICATIONS

Ulrey, Joseph N. et al., "Method and System for Engine Control," U.S. Appl. No. 14/245,945, filed Apr. 4, 2014, 57 pages.
Wooldridge, Steven et al., "Method and System for Improved Dilution Tolerance," U.S. Appl. No. 13/975,068, filed Aug. 23, 2013, 57 pages.
Styles, Daniel J. et al., "Method and System for Improved Dilution Purging," U.S. Appl. No. 14/085,696, filed Nov. 20, 2013, 55 pages.
State Intellectual Property Office of the People's Republic of China, Office Action and Search Report Issued in Application No. 201410641355.9, dated Jul. 3, 2018, 13 pages. (Submitted with Partial Translation).
State Intellectual Property Office of the People's Republic of China, Office Action and Search Report Issued in Application No. 201410641355.9, dated Mar. 5, 2019, 13 pages. (Submitted with Partial Translation).

* cited by examiner

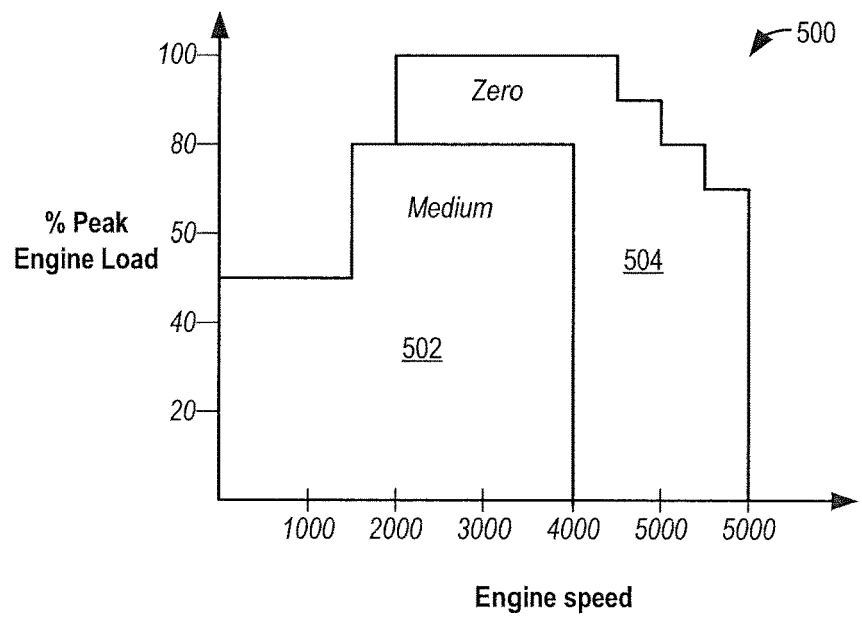
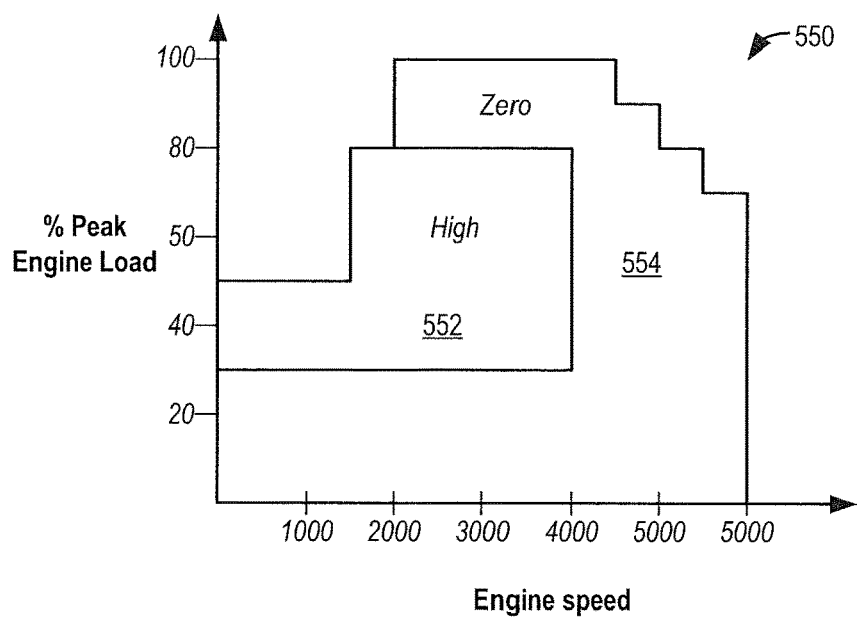
FIG. 5

METHOD AND SYSTEM FOR IMPROVED DILUTION PURGING

TECHNICAL FIELD

The present application relates to methods and systems for improving purging of low pressure EGR from an engine during operation at light loads.

BACKGROUND AND SUMMARY

Exhaust gas recirculation (EGR) systems recirculate a portion of exhaust gas from an engine exhaust to an engine intake system to improve fuel economy and vehicle emissions by reducing throttling losses and combustion temperatures. In turbo-charged direct injection engines, a low-pressure EGR (LP-EGR) circuit may be implemented. The LP-EGR circuit recirculates exhaust gases from an exhaust passage downstream of a turbine to an intake passage upstream of a turbocharger compressor.

However, due to the pre-compressor location of EGR delivery, there may a significant transport delay between the EGR valve and the combustion chamber. Specifically, the exhaust residuals may need to travel though the turbocharger compressor, high-pressure air induction plumbing, charge air cooler, and intake manifold before reaching the combustion chamber. As a result of the transport delay, during conditions when EGR needs to be rapidly reduced, such as during a tip-out to low load conditions, there may be more dilution in the intake than desired. The presence of increased intake-air dilution at low loads can increase combustion stability issues and the propensity for engine misfires.

One example approach for addressing the extra residuals is shown by Ma et al. in U.S. Pat. No. 6,014,959. Therein, a rigid connection is provided between an EGR throttle and a main air intake throttle, linking movement of the EGR throttle as a function of the movement of the main throttle. This allows EGR dilution to be always provided in a fixed proportion to the intake airflow.

However, the inventors herein have recognized potential issues with such an approach. As an example, the transport delay may not be sufficiently addressed while the fuel economy benefits of LP-EGR are limited. For example, the linking of EGR dilution to intake airflow may result in LP-EGR being provided at some low load points where no fuel economy benefit from the EGR is achieved. In some cases, there may even be a fuel penalty associated with the delivery of LP-EGR at the low load point. As such, it may not be possible to rapidly purge the LP-EGR from the intake in such systems without affecting airflow. As another example, the lower load points may limit the delivery of EGR at higher load points as they are the points where the combustion system is most dilution limited. As such, this can limit the peak EGR rates achievable during high loads. The presence of excess dilution in the engine intake system can also render the compressor susceptible to corrosion and condensation from the lingering EGR. Furthermore, increased condensation may occur at a charge air cooler of a boosted engine system due to the flow of EGR through the cooler. The increased condensation may necessitate additional counter-condensation measures.

The inventors have recognized that at least some of the above issues may be addressed by using a motor/generator of a hybrid vehicle system to rapidly purge LP-EGR. In one example, this is achieved by a method for a hybrid vehicle system comprising: in response to decreasing engine load while operating an engine with EGR, disabling fuel to the engine while using motor torque to propel the vehicle; and spinning the engine unfueled via a generator until EGR in the intake is less than a threshold. In this way, LP-EGR can be rapidly purged without affecting torque to the wheels.

As an example, during medium to high load conditions, a hybrid vehicle system may be operated in an engine mode with the engine combusting to provide engine torque for propelling the vehicle wheels. Further, during the engine mode, low pressure EGR (LP-EGR) may be flowing from the engine exhaust to the engine intake to provide addition fuel economy and emissions benefits. In response to a tip-out to lower load conditions, fuel injection to the engine may be disabled and motor torque from an electric motor/generator may be used to propel the vehicles. At the low load conditions, EGR may not be required in the engine and may need to be rapidly purged. Therefore, to expedite removal of LP-EGR from the engine, the engine may be spun, unfueled, via the generator. As such, during the spinning, each of an intake throttle and an EGR valve may be kept fully open to allow the EGR to be replaced with fresh intake air. The speed at which the engine is spun may be based on the engine speed prior to disabling fuel injection. Spinning of the engine via the generator may be continued for a duration until the LP-EGR (amount, flow, etc.) is below a threshold. In one example, spinning may be continued until all the LP-EGR has been replaced with fresh intake air. Then, once the LP-EGR is sufficiently purged, the engine may be spun to rest and maintained shutdown until torque demand is high enough to require the engine to be restarted. In the meantime, the vehicle may continue to be propelled via motor torque.

In this way, EGR purging from an engine intake can be expedited. By actively spinning the engine unfueled via a motor/generator, with an intake throttle and an EGR valve open, pumping work of the spinning engine can be used to draw in fresh air and expel EGR from the intake manifold. As such, this enables EGR levels in the intake manifold to be reduced faster than would have been otherwise possible. In addition, higher engine torque and battery charge may be held while EGR is purged. By rapidly reducing the intake EGR level at low load conditions when the engine is shutdown, higher EGR rates can be achieved when the engine is subsequently restarted. As such, this substantially improves engine efficiency, particularly in medium to high engine speed-load regions. By replacing the EGR with fresh air, evaporation of water and hydrocarbon condensates is increased, reducing their concentration in the engine, and the need for counter-condensation measures. In addition, the reduction in condensation reduces compressor and charge air cooler corrosion and degradation. Overall, boosted engine performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows example EGR schedules at selected engine speed-load conditions.

DETAILED DESCRIPTION

The following description relates to systems and methods for using a motor/generator of a hybrid vehicle system (such as the vehicle system of FIG. 1) to expedite purging of EGR from an engine (such as the engine system of FIGS. 2-3) at low load conditions. While operating the hybrid vehicle in an engine mode, with EGR flowing, in response to decreasing engine load, EGR delivery to the engine may need to be rapidly reduced. During such conditions, a controller may be configured to perform a control routine, such as the example routine of FIG. 4, to disable fuel to the engine and propel the vehicle using motor torque. In addition, the controller may spin the engine, unfueled, using motor torque, for a duration until EGR is sufficiently purged from the engine's intake manifold. Alternatively, if the vehicle system battery is capable of accepting charge, the controller may disable EGR and operate the engine with the EGR valve closed while storing the excess engine torque generated as battery charge. Example adjustments are shown with reference to FIG. 6. In this way, during subsequent engine operation, higher EGR schedules may be achieved, particularly at medium to high engine speed-load conditions (FIG. 5). Overall, engine performance is improved.

Figure 1:
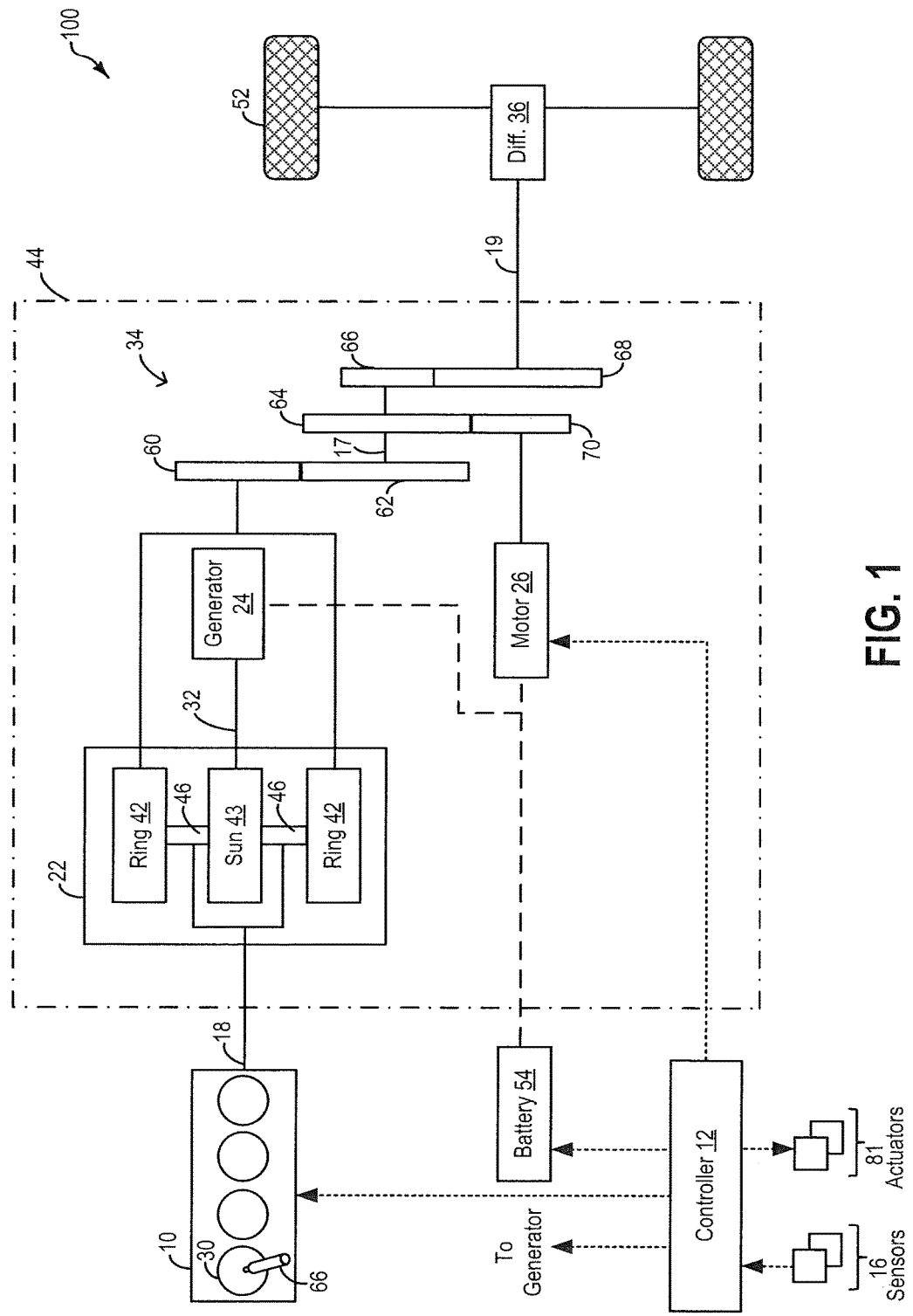
FIG. 1 shows a schematic depiction of a hybrid electric vehicle system.

FIG. 1 depicts a hybrid propulsion system 100 for a vehicle. In the depicted embodiment, the vehicle is a hybrid electric vehicle (HEV). Propulsion system 100 includes an internal combustion engine 10 having a plurality of cylinders 30. Fuel may be provided to each cylinder of engine 10 from a fuel system (not shown) including one or more fuel tanks, one or more fuel pumps, and injectors 66.

Engine 10 delivers power to transmission 44 via torque input shaft 18. In the depicted example, transmission 44 is a power-split transmission (or transaxle) that includes a planetary gearset 22 and one or more rotating gear elements. Transmission 44 further includes an electric generator 24 and an electric motor 26. The electric generator 24 and the electric motor 26 may also be referred to as electric machines as each may operate as either a motor or a generator. Torque is output from transmission 44, for propelling vehicle tractions wheels 52, via a power transfer gearing 34, a torque output shaft 19, and differential-and-axle assembly 36.

Generator 24 is drivably connected to electric motor 26 such that each of electric generator 24 and electric motor 26 may be operated using electric energy from an electrical energy storage device, herein depicted as battery 54. In some embodiments, an energy conversion device, such as an inverter, may be coupled between the battery and the motor to convert the DC output of the battery into an AC output for use by motor. However, in alternate embodiments, the inverter may be configured in the electric motor.

Electric motor 26 may be operated in a regenerative mode, that is, as a generator, to absorb energy from vehicle motion and/or the engine and convert the absorbed kinetic energy to an energy form suitable for storage in battery 54. Furthermore, electric motor 26 may be operated as a motor or generator, as required, to augment or absorb torque provided by the engine.

Planetary gearset 22 comprises a ring gear 42, a sun gear 43, and a planetary carrier assembly 46. The ring gear and sun gear may be coupled to each other via the carrier. A first input side of planetary gearset 22 is coupled to engine 10 while a second input side of the planetary gearset 22 is coupled to the generator 24. An output side of the planetary gearset is coupled to vehicle traction wheels 52 via power transfer gearing 34 including one or more meshing gear elements 60-68. In one example, the meshing gear elements 60-68 may be step ratio gears wherein carrier assembly 46 may distribute torque to the step ratio gears. Gear elements 62, 64, and 66 are mounted on a countershaft 17 with gear element 64 engaging an electric motor-driven gear element 70. Electric motor 26 drives gear element 70, which acts as a torque input for the countershaft gearing. In this way, the planetary carrier 46 (and consequently the engine and generator) may be coupled to the vehicle wheels and the motor via one or more gear elements. Hybrid propulsion system 100 may be operated in various embodiments including a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event.

For example, the vehicle may be driven in an engine mode wherein engine 10 is operated in conjunction with the electric generator (which provides reaction torque to the planetary gearset and allows a net planetary output torque for propulsion) and used as the primary source of torque for powering wheels 52 (the generator may also be providing torque to wheels if in motoring mode). During the engine mode, fuel may be supplied to engine 10 from a fuel tank via fuel injector 66 so that the engine can spin fueled to provide the torque for propelling the vehicle. Specifically, engine power is delivered to the ring gear of the planetary gearset. Coincidentally, the generator provides torque to the sun gear 43, producing a reaction torque to the engine. Consequently, torque is output by the planetary carrier to gears 62, 64, 66 on countershaft 17, which in turn delivers the power to wheels 52. Additionally, the engine can be operated to output more torque than is needed for propulsion, in which case the additional power is absorbed by the generator (in generating mode) to charge the battery 54 or supply electrical power for other vehicle loads.

In another example, the vehicle may be driven in an assist mode wherein engine 10 is operated and used as the primary source of torque for powering wheels 52 and the electric motor is used as an additional torque source to act in cooperation with, and supplement the torque provided by, engine 10. During the assist mode, as in the engine mode, fuel is supplied to engine 10 so as to spin the engine fueled and provide torque to the vehicle wheels.

In still another example, the vehicle may be driven in an engine-off or electric mode wherein battery-powered electric motor 26 is operated and used as the only source of torque for driving wheels 52. As such, during the electric mode, no fuel may be injected into engine 10 irrespective of whether the engine is spinning or not. The electric mode may be employed, for example, during braking, low speeds, low loads, while stopped at traffic lights, etc. Specifically, motor power is delivered to gear element 70, which in turn drives the gear elements on countershaft 17, and thereon drives wheels 52.

Propulsion system 100 may further include a control system including controller 12 configured to receive information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, etc. The various actuators may include, for example, the gear set, cylinder fuel injectors (not shown), an air intake throttle coupled to the engine intake manifold (not shown), etc. Additional sensors and actuators are elaborated at FIGS. 2-3. Controller 12 may receive input data from the various sensors, process the input data, and trigger the actuators in response to the processed input data based on instruction or code programmed therein corresponding to one or more routines. An example control routine is described herein with regard to FIG. 4.

Figure 2:
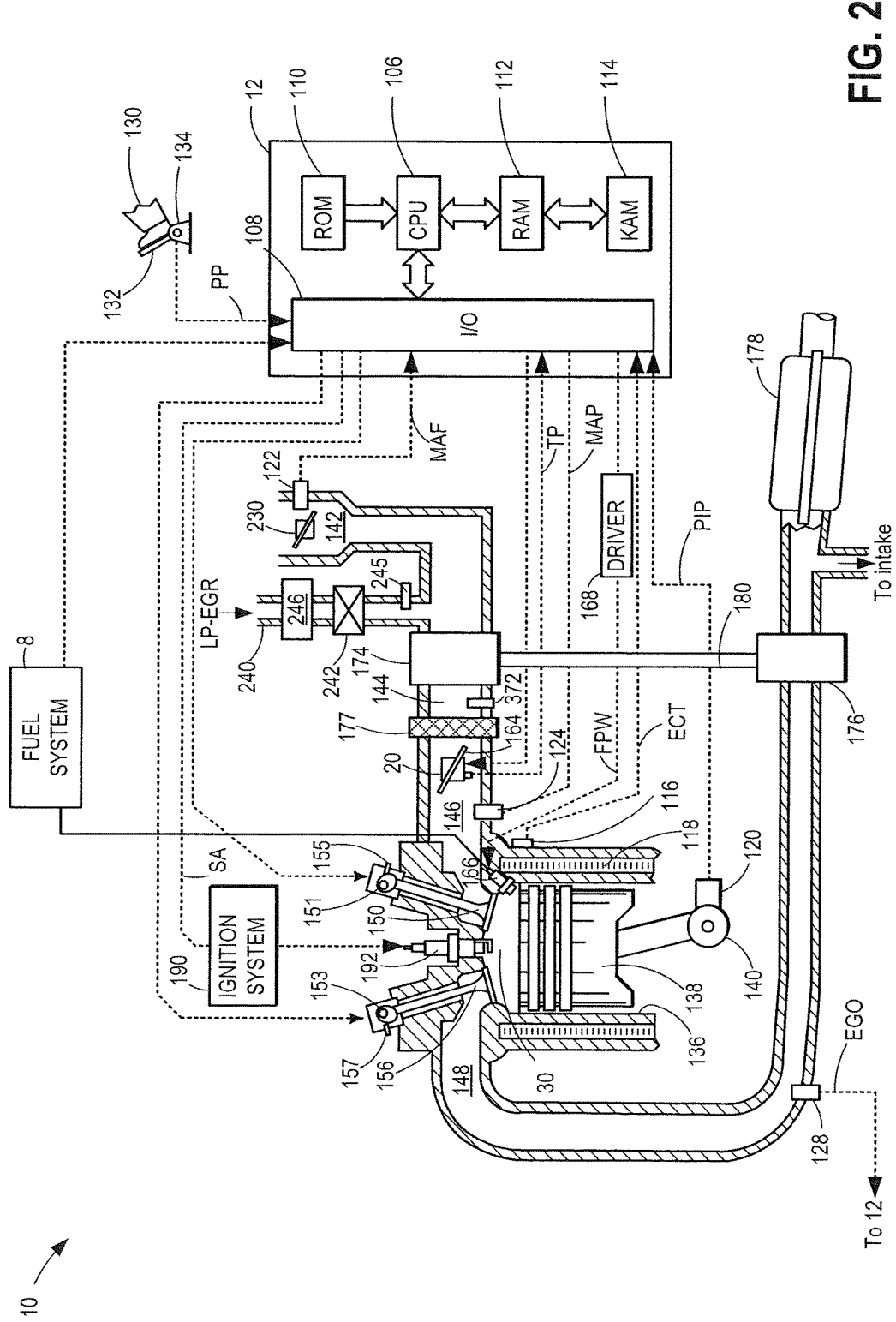
FIG. 2 shows a schematic depiction of a combustion chamber of an engine system of FIG. 1.

FIG. 2 depicts an example embodiment of a combustion chamber or cylinder of engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10. Specifically, the generator 24 (of FIG. 1) and driveline including motor 26 (of FIG. 1) may be coupled to the crankshaft and provide torque for engine cranking.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174. In some embodiments, as elaborated with reference to FIG. 3, a charge air cooler (CAC) may be located downstream of compressor 174 and upstream of throttle 20 for cooling a boosted aircharge delivered to the engine. Alternatively, the CAC can be located downstream of the throttle integrated in the intake manifold 146.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 13:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock or pre-ignition suppressing fluid thereto. In some embodiments, the fluid may be a fuel, wherein the injector is also referred to as a fuel injector. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different qualities, such as different compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc.

Further, in the disclosed embodiments, an EGR system may route a desired portion of exhaust gas from exhaust passage 148 to air induction passage 142. FIG. 2 shows an LP-EGR system wherein LP-EGR is routed through LP-EGR passage 240 from downstream of turbine 176 to upstream of compressor 174. The amount of LP-EGR provided to intake passage 142 may be varied by controller 12 via LP-EGR valve 242. Likewise, there may be an HP-EGR system (shown at FIG. 3) wherein HP-EGR is routed through an HP-EGR passage from upstream of turbine 176 to downstream of compressor 174. The amount of HP-EGR provided to intake passage 146 may be varied by controller 12 via a dedicated HP-EGR valve. The HP-EGR system may include an HP-EGR cooler (see FIG. 3) and the LP-EGR system may include LP-EGR cooler 246 to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, temperature, concentration of $O_2$, and concentration of the exhaust gas. In some embodiments, one or more sensors may be positioned within LP-EGR passage 240 to provide an indication of one or more of a pressure, temperature, and air-fuel ratio of exhaust gas recirculated through the LP-EGR passage. Exhaust gas diverted through LP-EGR passage 240 may be diluted with fresh intake air at a mixing point located at the junction of LP-EGR passage 240 and intake passage 142. Specifically, by adjusting LP-EGR valve 242 in coordination with a low pressure air-induction system (LP AIS) throttle 230 (further elaborated at FIG. 3), a dilution of the EGR flow may be adjusted.

A percent dilution of the LP-EGR flow may be inferred from the output of a sensor 245 in the EGR gas stream. Specifically, sensor 245 may be positioned downstream of LP-EGR valve 242, such that the LP-EGR dilution may be accurately determined. Sensor 245 may be, for example, an EGR delta pressure over orifice, delta pressure over valve or hot wire or hot film anemometer flow meter. An oxygen sensor such as a UEGO sensor 372 can also be used to measure EGR in the main intake duct 142 or 144.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Figure 3:
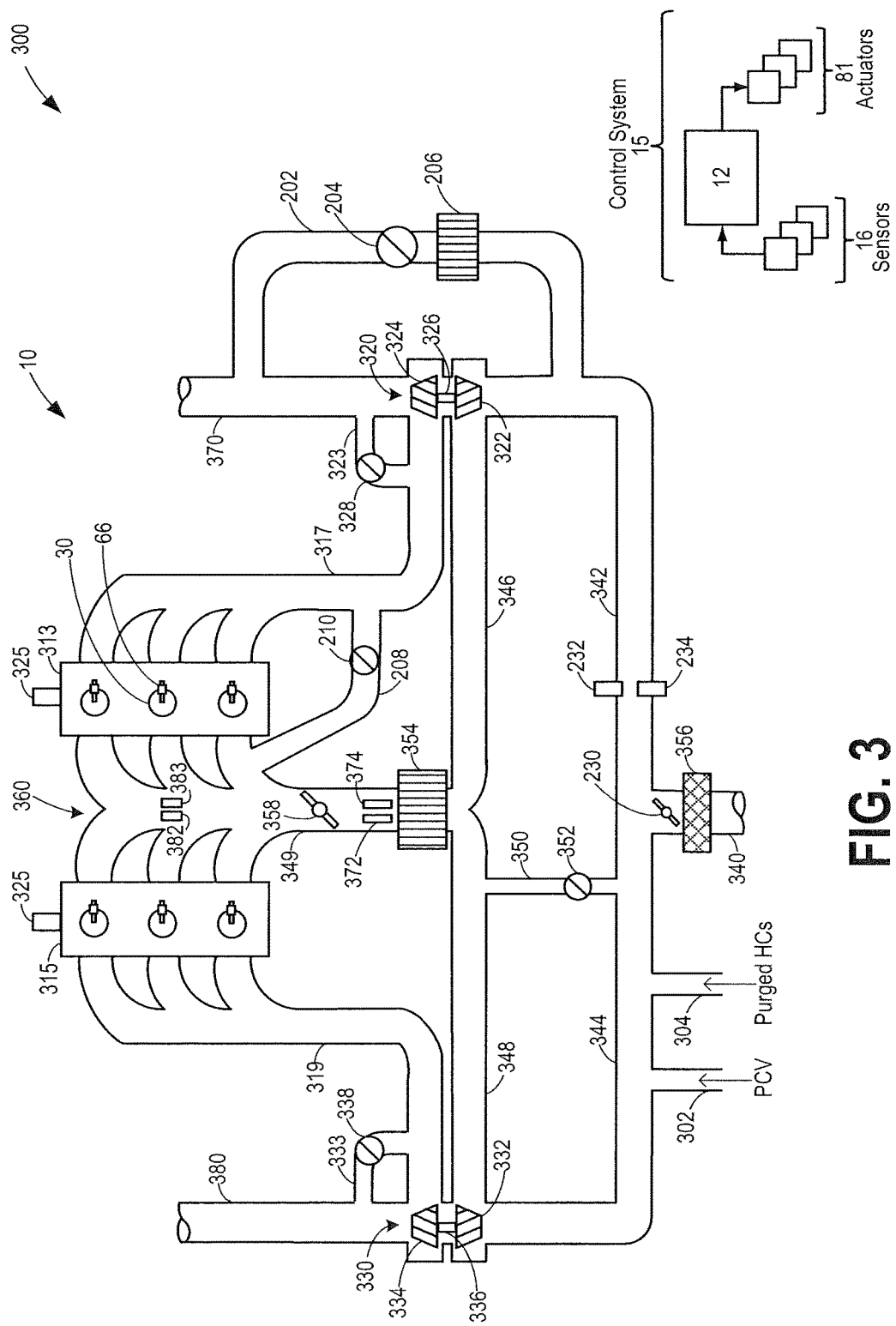
FIG. 3 depicts an example engine system configured with exhaust gas recirculation (EGR) capabilities.

Now turning to FIG. 3, an example embodiment 300 of an engine system 10 (such as the engine system of FIGS. 1-2) including a plurality of cylinder banks and an exhaust gas recirculation system is illustrated. Embodiment 300 depicts a turbocharged engine system including a multi-cylinder internal combustion engine 10 and twin turbochargers 320 and 330. As one non-limiting example, engine system 300 can be included as part of a propulsion system for a passenger vehicle. Engine system 300 can receive intake air via intake passage 340. Intake passage 340 can include an air filter 356 and an EGR throttle valve 230. Engine system 300 may be a split-engine system wherein intake passage 340 is branched downstream of EGR throttle valve 230 into first and second parallel intake passages, each including a turbocharger compressor. Specifically, at least a portion of intake air is directed to compressor 322 of turbocharger 320 via a first parallel intake passage 342 and at least another portion of the intake air is directed to compressor 332 of turbocharger 330 via a second parallel intake passage 344 of the intake passage 340.

The first portion of the total intake air that is compressed by compressor 322 may be supplied to intake manifold 360 via first parallel branched intake passage 346. In this way, intake passages 342 and 346 form a first parallel branch of the engine's air intake system. Similarly, a second portion of the total intake air can be compressed via compressor 332 where it may be supplied to intake manifold 360 via second parallel branched intake passage 348. Thus, intake passages 344 and 348 form a second parallel branch of the engine's air intake system. As shown in FIG. 3, intake air from intake passages 346 and 348 can be recombined via a common intake passage 349 before reaching intake manifold 360, where the intake air may be provided to the engine.

A first EGR throttle valve 230 may be positioned in the engine intake upstream of the first and second parallel intake passages 342 and 344, while a second air intake throttle valve 358 may be positioned in the engine intake downstream of the first and second parallel intake passages 342 and 344, and downstream of the first and second parallel branched intake passages 346 and 348, for example, in common intake passage 349.

In some examples, intake manifold 360 may include an intake manifold pressure sensor 382 for estimating a manifold pressure (MAP) and/or an intake manifold temperature sensor 383 for estimating a manifold air temperature (MCT), each communicating with controller 12. Intake passage 349 can include a charge air cooler (CAC) 354 and/or a throttle (such as second throttle valve 358). The position of throttle valve 358 can be adjusted by the control system via a throttle actuator (not shown) communicatively coupled to controller 12. An anti-surge valve 352 may be provided to selectively recirculate flow through the compressor stages of turbochargers 320 and 330 via recirculation passage 350. As one example, anti-surge valve 352 can open to enable flow through recirculation passage 350 when the intake air pressure upstream of the compressors attains a threshold value.

Air duct 349 may further include an intake gas oxygen sensor 372. In one example, the oxygen sensor is a UEGO sensor. The intake gas oxygen sensor may be configured to provide an estimate regarding the oxygen content of fresh air received in the intake manifold. In addition, when EGR is flowing, a change in oxygen concentration at the sensor may be used to infer an EGR amount and used for accurate EGR flow control. In the depicted example, oxygen sensor 372 is positioned upstream of throttle 358 and downstream of charge air cooler 354. However, in alternate embodiments, the oxygen sensor may be positioned upstream of the CAC. A pressure sensor 374 may be positioned alongside the oxygen sensor for estimating an intake pressure at which an output of the oxygen sensor is received. Since the output of the oxygen sensor is influenced by the intake pressure, a reference oxygen sensor output may be learned at a reference intake pressure. In one example, the reference intake pressure is a throttle inlet pressure (TIP) where pressure sensor 374 is a TIP sensor. In alternate examples, the reference intake pressure is a manifold pressure (MAP) as sensed by MAP sensor 382.

Engine 10 may include a plurality of cylinders 30. In the depicted example, engine 10 includes six cylinders arrange in a V-configuration. Specifically, the six cylinders are arranged on two banks 313 and 315, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 30 may be configured with a fuel injector 66. In the depicted example, fuel injector 66 is a direct in-cylinder injector. However, in other examples, fuel injector 66 can be configured as a port based fuel injector.

Intake air supplied to each cylinder 30 (herein, also referred to as combustion chamber 30) via common intake passage 349 may be used for fuel combustion and products of combustion may then be exhausted from via bank-specific parallel exhaust passages. In the depicted example, a first bank 313 of cylinders of engine 10 can exhaust products of combustion via a first parallel exhaust passage 317 and a second bank 315 of cylinders can exhaust products of combustion via a second parallel exhaust passage 319. Each of the first and second parallel exhaust passages 317 and 319 may further include a turbocharger turbine. Specifically, products of combustion that are exhausted via exhaust passage 317 can be directed through exhaust turbine 324 of turbocharger 320, which in turn can provide mechanical work to compressor 322 via shaft 326 in order to provide compression to the intake air. Alternatively, some of the exhaust gases flowing through exhaust passage 317 can bypass turbine 324 via turbine bypass passage 323 as controlled by wastegate 328. Similarly, products of combustion that are exhausted via exhaust passage 319 can be directed through exhaust turbine 334 of turbocharger 330, which in turn can provide mechanical work to compressor 332 via shaft 336 in order to provide compression to intake air flowing through the second branch of the engine's intake system. Alternatively, some of the exhaust gas flowing through exhaust passage 319 can bypass turbine 334 via turbine bypass passage 333 as controlled by wastegate 338.

In some examples, exhaust turbines 324 and 334 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 324 and 334 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 324 and 334 via respective actuators.

Exhaust gases in first parallel exhaust passage 317 may be directed to the atmosphere via branched parallel exhaust passage 370 while exhaust gases in second parallel exhaust passage 319 may be directed to the atmosphere via branched parallel exhaust passage 380. Exhaust passages 370 and 380 may include one or more exhaust after-treatment devices, such as a catalyst, and one or more exhaust gas sensors.

Engine 10 may further include one or more exhaust gas recirculation (EGR) passages, or loops, for recirculating at least a portion of exhaust gas from the exhaust manifold to the intake manifold. These may include high-pressure EGR loops for proving high-pressure EGR (HP-EGR) and low-pressure EGR-loops for providing low-pressure EGR (LP-EGR). In one example, HP-EGR may be provided in the absence of boost provided by turbochargers 320, 330, while LP-EGR may be provided in the presence of turbocharger boost and/or when exhaust gas temperature is above a threshold. In still other examples, both HP-EGR and LP-EGR may be provided simultaneously.

In the depicted example, engine 10 may include a low-pressure EGR loop 202 for recirculating at least some exhaust gas from the first branched parallel exhaust passage 370, downstream of the turbine 324, to the first parallel intake passage 342, upstream of the compressor 322. In some embodiments, a second low-pressure EGR loop (not shown) may be likewise provided for recirculating at least some exhaust gas from the second branched parallel exhaust passage 380, downstream of the turbine 334, to the second parallel intake passage 344, upstream of the compressor 332. LP-EGR loop 202 may include LP-EGR valve 204 for controlling an EGR flow (i.e., an amount of exhaust gas recirculated) through the loops, as well as an EGR cooler 206 for lowering a temperature of exhaust gas flowing through the EGR loop before recirculation into the engine intake. Under certain conditions, the EGR cooler 206 may also be used to heat the exhaust gas flowing through LP-EGR loop 202 before the exhaust gas enters the compressor to avoid water droplets impinging on the compressors.

Engine 10 may further include a first high-pressure EGR loop 208 for recirculating at least some exhaust gas from the first parallel exhaust passage 317, upstream of the turbine 324, to the first branched parallel intake passage 346, downstream of the compressor 322. Likewise, the engine may include a second high-pressure EGR loop (not shown) for recirculating at least some exhaust gas from the second parallel exhaust passage 318, upstream of the turbine 334, to the second branched parallel intake passage 348, downstream of the compressor 332. EGR flow through HP-EGR loops 208 may be controlled via HP-EGR valve 210. As such, HP-EGR may be injected downstream of the engine throttle 358 to improve the flow capability under some operating conditions. Alternatively, the HP EGR loop(s) may include an EGR cooler (not shown.)

A PCV port 302 may be configured to deliver crankcase ventilation gases (blow-by gases) to the engine intake manifold along second parallel intake passage 344. In some embodiments, flow of PCV air through PCV port 302 (e.g., PCV flow) may be controlled by a dedicated PCV port valve. Likewise, a purge port 304 may be configured to deliver purge gases from a fuel system canister to the engine intake manifold along passage 344. In some embodiments, flow of purge air through purge port 304 may be controlled by a dedicated purge port valve.

Humidity sensor 232 and pressure sensor 234 may be included in only one of the parallel intake passages (herein, depicted in the first parallel intake air passage 342 but not in the second parallel intake passage 344), downstream of EGR throttle valve 230. Specifically, the humidity sensor and the pressure sensor may be included in the intake passage not receiving the PCV or purge air. Humidity sensor 232 may be configured to estimate a relative humidity of the intake air. In one embodiment, humidity sensor 232 is a UEGO sensor configured to estimate the relative humidity of the intake air based on the output of the sensor at one or more voltages. Since purge air and PCV air can confound the results of the humidity sensor, the purge port and PCV port are positioned in a distinct intake passage from the humidity sensor. Alternatively, they may be positioned downstream of the humidity sensor. Pressure sensor 234 may be configured to estimate a pressure of the intake air. In some embodiments, a temperature sensor may also be included in the same parallel intake passage, downstream or upstream of the EGR throttle valve 230.

Intake oxygen sensor 372 may be used for estimating an intake air oxygen concentration and inferring an amount of EGR flow through the engine based on a change in the intake oxygen concentration upon opening of the EGR valve 204. Specifically, a change in the output of the sensor upon opening the EGR valve is compared to a reference point where the sensor is operating with no EGR (the zero point). Based on the change (e.g., decrease) in oxygen amount from the time of operating with no EGR, an EGR flow currently provided to the engine can be calculated. For example, upon applying a reference voltage (Vs) to the sensor, a pumping current (Ip) is output by the sensor. The change in oxygen concentration may be proportional to the change in pumping current (delta Ip) output by the sensor in the presence of EGR relative to sensor output in the absence of EGR (the zero point). Based on a deviation of the estimated EGR flow from the expected (or target) EGR flow, further EGR control may be performed.

The position of intake and exhaust valves of each cylinder 30 may be regulated via hydraulically actuated lifters coupled to valve pushrods, or via a cam profile switching mechanism in which cam lobes are used. Specifically, the intake valve cam actuation system 325 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 300 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include humidity sensor 232, intake air pressure sensor 234, MAP sensor 382, MCT sensor 383, TIP sensor 374, and intake air oxygen sensor 372. In some examples, common intake passage 349 may further include a throttle inlet temperature sensor for estimating a throttle air temperature (TCT). In other examples, one or more of the EGR passages may include pressure, temperature, and hot-wire or hot-film anemometer flow sensors, for determining EGR flow characteristics. As another example, actuators 81 may include fuel injector 66, HP-EGR valve 210, LP-EGR valve 204, throttle valves 358 and 230, and wastegates 328, 338. Other actuators, such as a variety of additional valves and throttles, may be coupled to various locations in engine system 300. Controller 12 may receive input data from the various sensors, process the input data, and trigger the actuators in response to the processed input data based on instruction or code programmed therein corresponding to one or more routines. An example control routine is described herein with regard to FIG. 4.

Figure 4:
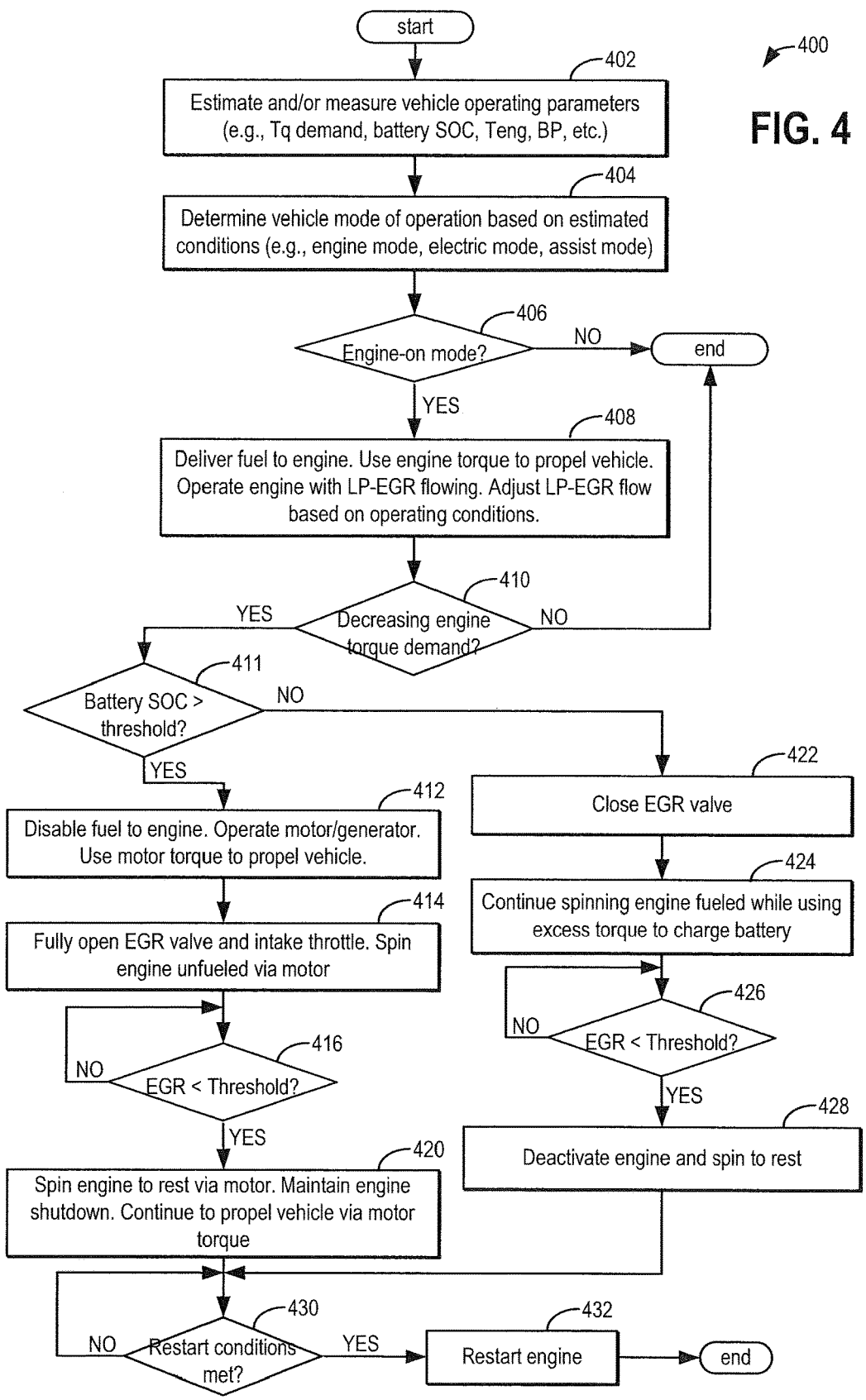
FIG. 4 shows a high level flow chart for operating the hybrid vehicle system of FIG. 1 to expedite purging of low pressure EGR.

Now turning to FIG. 4, an example routine 400 is shown for operating the vehicle system of FIG. 1. Specifically, the method of FIG. 4 enables low pressure EGR to be rapidly purged from the engine system of FIGS. 2-3. A controller may selectively operate a generator of the vehicle system to spin the engine unfueled during decreasing load conditions to rapidly replace intake EGR with fresh intake air. Alternatively, if the system battery is capable of accepting charge, the controller may operate the engine in a generating mode with EGR disabled to replace intake EGR with fresh air while using the excess engine torque generated to charge the battery. In both cases, the dilution tolerance of the engine system is improved, likelihood of misfires is reduced, and peaks EGR rates achievable during subsequent high load operations is increased.

At 402, engine operating conditions and vehicle operating parameters are estimated and/or measured. These include, for example, a brake pedal position, accelerator pedal position, operator torque demand, battery state of charge (SOC), engine temperature (Teng), ambient temperature and humidity, barometric pressure (BP), etc. In one example, the hybrid vehicle system is a power split hybrid vehicle system.

At 404, a vehicle mode of operation may be determined based on the estimated operating conditions. For example, based at least on the estimated driver torque demand and the battery state of charge, it may be determined whether the vehicle is to be operated in an engine-only mode (with the engine driving the vehicle wheels), an assist mode (with the battery assisting the engine in driving the vehicle), or an electric-only mode (with only the battery driving the vehicle). In one example, if the demanded torque can be provided by only the battery, the vehicle may be operated in the electric-only mode. In another example, if the demanded torque cannot be provided by the battery, the vehicle may be operated in the engine mode, or in the assist mode. The vehicle may accordingly be operated in the determined mode of operation.

At 406, it may be confirmed that the vehicle is in an engine-on mode. For example, it may be confirmed that the vehicle is in an engine-only mode where the vehicle is being propelled with engine torque only. Alternatively, it may be confirmed that the vehicle is in an assist mode and that the vehicle is being propelled, at least in part, with engine torque. If the engine-on mode is not confirmed, the routine may end.

At 408, fuel may be delivered to the engine to operate the engine and generate engine torque for propelling the vehicle. Herein, the engine output torque may correspond to a torque demanded for vehicle propulsion. In one example, based on the engine operating conditions, such as the engine speed-load conditions, the engine may be operating boosted with fuel delivered to the boosted engine via direct injection. In addition, the engine may be operating with EGR enabled or flowing. Herein, operating with EGR includes operating with low pressure EGR (LP-EGR) flowing. By flowing LP-EGR during engine operation, fuel economy is improved via pumping work reduction, knock mitigation, combustion efficiency improvement, and enrichment reduction. Operating the engine with low pressure EGR includes operating the engine with an EGR valve coupled in an LP-EGR passage open.

In one example, the LP-EGR schedule may be a flat schedule wherein LP-EGR is delivered at a fixed rate relative to airflow. The LP-EGR includes cooled exhaust residuals recirculated from an engine exhaust manifold, downstream of an exhaust turbine, to an engine intake manifold, upstream of an intake compressor.

As such, the amount of EGR (HP-EGR, LP-EGR, or a combination of the two) delivered to the intake may be based on an engine-speed load map stored in the memory of controller 12. In one example, the engine speed-load map may include at least two LP-EGR operating modes, including a fixed and a variable operating mode. The fixed mode range may comprise all engine speeds and loads over the normal range of engine operation. The fixed mode may "taper out" LP EGR at very high engine speeds and loads including full load to avoid conflicts with engine performance. In comparison, the variable EGR mode may allow for variable EGR rates over the normal range of engine operation.

At 410, it may be determined if decreasing engine load conditions are present. Specifically, it may be determined if there is a drop in engine torque demand and decreasing engine torque demand conditions are present. For example, decreasing engine load/demand may be responsive to an operator pedal tip-out. As such, during the decreasing engine load/demand, airflow to the engine may be decreased and correspondingly, LP-EGR to the engine may also be decreased. However, due to a large transport delay between the LP-EGR valve and the combustion chamber, EGR may not be decreased as fast as required. Specifically, since the LP-EGR passage takes off exhaust gas after the turbine and injects exhaust gas before the compressor, there is a large delay in purging of the EGR from the intake manifold. The delay is exacerbated by the presence of a large boosted volume (e.g., six times the volume) over engine displacement in some engine configurations. The delay in purging leads to combustion stability risks. For example, the presence of more dilution than required can increase the likelihood of misfires.

The adoption of the flat EGR schedule, wherein the EGR rate is kept constant relative to airflow, helps in alleviating some of the issues associated with the delayed purging. However, the use of a flat schedule results in operating LP-EGR at some lower load points where no fuel economy benefit is achieved. In fact, in some lower engine speed-load points, operating LP-EGR results in a fuel penalty. In addition, the compressor may be exposed to EGR at the low load conditions, necessitating corrosion and condensation countermeasures. As EGR flows through the charge air cooler, additional condensation may arise that may also need to be addressed. At some low load conditions, a low pressure air intake throttle may also need to be operated to drive the EGR flow. Furthermore, the lower load points limit the flat EGR schedule at higher load points as the lower load points are the points where the combustion system is the most dilution (EGR) limited. For example, the flat schedule limits the peak EGR rate achievable at higher engine speed-load conditions. As such, this limits the fuel economy benefit of LP-EGR.

FIG. 5 depicts an example flat EGR schedule at map 500. As shown therein, a flat schedule with EGR delivered at a fixed rate relative to airflow is applied in engine speed-load regions corresponding to zone 502. Outside of zone 502, in zone 504, no LP-EGR is used. While the delivery of cooled LP-EGR at a fixed rate provides significant fuel economy benefits in the mid speed-load region (upper half of zone 502), the benefit may be limited. As such, it may be desirable to operate with more LP-EGR in this region. However, due to the large EGR transport delay, this may not be achievable. In addition, the flat schedule of map 500 results in operating LP-EGR at the low engine speed-load conditions (lower half of zone 502) where a potential fuel penalty may be incurred. As such, it may be desirable to not operate with any EGR in this region. However, due to the delivery of EGR at a pre-compressor location, and the resulting large EGR transport delay, this may not be achievable.

The inventors herein have recognized that EGR purging can be expedited by operating a motor of the hybrid vehicle to replace the EGR in the intake manifold with fresh intake air. In particular, in response to decreasing engine torque demand or load while operating an engine with EGR flow, fuel to the engine may be disabled and the engine may be spun unfueled via the motor until EGR is sufficiently purged from the intake. Alternatively, if a system battery is capable of accepting charge, EGR purging can be expedited by disabling EGR and operating the engine in a generating mode to replace intake EGR with fresh air, while using the excess engine torque to charge the system battery.

For example, by expediting the purging of LP-EGR, an EGR schedule such as the schedule of map 550 of FIG. 5 may be achieved. Specifically, by allowing for rapid purging of LP-EGR at low load conditions, it may be possible to operate with no LP-EGR at low engine speed-load regions, such as shown at zone 554. By decreasing running of cooled LP-EGR at lower loads, and relying instead on hot internal EGR, fuel economy and engine performance is improved in this operating region. In addition, by allowing for rapid purging and resetting of EGR to substantially zero LP-EGR conditions at decreasing engine loads, higher peak EGR rates can be achieved during subsequent increasing engine loads. For example, it may be possible to operate with higher LP-EGR rates at medium speed-load regions, such as show at zone 552.

Returning to FIG. 4, in response to decreasing engine load and torque demand, at 411, the battery state of charge (SOC) may be estimated and/or measured and compared to a threshold charge. The routine further determines if the battery state of charge is higher than a threshold charge. The threshold charge may be defined to allow for a small additional engine-on time and subsequent charging to enable the EGR purge.

If the battery state of charge is higher than the threshold charge, then it may be determined that the battery is not capable of accepting further charge. Accordingly, at 412, in response to the decreasing engine torque demand, engine fueling is disabled while a motor/generator of the hybrid vehicle system is operated. As a result, while the engine is disabled, the vehicle is propelled using motor torque instead of engine torque. At 414, to expedite purging of LP-EGR from the engine intake manifold, the routine includes spinning the engine unfueled via the motor/generator. For example, the engine may be spun unfueled for an additional 1-3 seconds via the generator. In addition, while spinning the engine, each of an EGR valve in a LP-EGR passage and an intake throttle in the intake passage may be fully opened. By opening the EGR valve and the intake throttle fully during the spinning, the EGR system as well as the air induction system may be purged of exhaust residuals and replenished with fresh intake air.

Spinning the engine unfueled via the motor includes operating the generator using electrical energy from the system battery to spin the engine at a selected engine speed. The engine may be spun unfueled at a selected engine speed that is based on the engine speed before the fuel injectors are shut-off. For example, the controller may operator the generator to maintain the engine speed that the engine was spinning at immediately before the fuel injectors were disabled. As another example, the generator may spin the engine unfueled at an engine speed that is a function (e.g., fraction) of the engine speed that the engine was spinning at immediately before the fuel injectors were disabled. Alternatively, the selected engine speed may be a speed that is efficient for both the engine and the transmission. As such, the purge time required to completely purge the EGR will be a function of engine speed and throttle position.

In an alternate example, the engine may be spun unfueled at a speed based on the vehicle speed. For example, the engine speed may be set to be a calibratable speed that is stored in the controller's memory in a look-up table accessed as a function of the vehicle speed. In yet another example, the engine may be spun at a speed based on the vehicle speed and a rotational speed (or rotational speed limit) of the rotating components of the planetary gear transmission. Motor/generator settings may be adjusted to enable the engine to be spun, via motor torque, at the selected engine speed. In some embodiments, each of the generator and the motor may be operated to spin the engine at the selected engine speed. In other embodiments, only the generator may need to be operated.

In yet another example, the engine may be spun unfueled at an engine speed corresponding to at least a cranking speed of the engine. In addition to expediting EGR purging, this allows the engine to be rapidly restarted in the event of a driver change-of-mind operation (such as where the operator tips-out and then tips-in soon after). For example, in response to an indication of an operator change of mind, the controller may start to fuel the engine and spin up the engine from the cranking speed so as to meet operator torque demand.

In still other examples, the engine may be spun unfueled at an engine speed that allows the EGR to be purged as fast as possible. Herein, the engine speed may be selected based on the intake EGR level at a time of the decreasing engine torque demand (e.g., at a time of operator pedal tip-out). For example, the engine speed may be transiently raised to a maximum allowable engine speed that does not affect torque output but that allows EGR to be purged as fast as possible. In yet another example, the engine may be spun unfueled at an engine speed that allows the EGR to be purged at a slower rate. For example, the operator pedal tip-out and decreasing engine load/torque demand may occur during a downhill vehicle travel. The operator may indicate a long downhill travel segment by pressing a button on the vehicle dashboard or via an interactive display on a center console of the vehicle. By indicating a long downhill travel, the operator may indicate that the engine may be shut down for a longer duration. Accordingly, during the downhill travel, the engine may be spun unfueled via the generator so that EGR purging can be completed by the time the downhill travel is completed.

In further examples, instead of spinning the engine continuously until EGR is purged, the engine may be spun unfueled via the generator intermittently. For example, during a downhill travel, the engine may be pulsed unfueled via the generator to purge the EGR.

At 416, it may be determined if the EGR has been sufficiently purged from the engine intake manifold. For example, it may be determined if EGR (flow, amount, concentration, level, etc.) in the intake is lower than a threshold. In one example, an intake oxygen sensor, such as sensor 372 of FIG. 3, may be used to estimate the concentration of EGR in the intake. Therein, a drop in intake oxygen concentration may be used to infer an increase in EGR dilution delivery. In one example, the threshold is based on EGR tolerance of the engine at low engine load conditions. For example, as the EGR tolerance increases, the threshold may be increased.

If the LP-EGR is not lower than the threshold, then the controller may continue to spin the engine unfueled via the motor/generator until EGR is sufficiently purged. If EGR is lower than the threshold, then at 420, the routine includes spinning the engine to rest. For example, the engine may be spun to rest via the motor and thereafter the engine may be maintained shutdown until engine restart conditions are met. In the meantime, the vehicle may continue to be propelled using motor torque. As such, this allows the LP-EGR rate to be reset (for example, to zero) such that when the engine is restarted, a known, higher LP-EGR rate can be realized to improve engine efficiency in the key medium load region of the speed-load map.

At 430, it may be determined if engine restart conditions are met. For example, the engine may be restarted in response to one or more of the battery state of charge being lower than a threshold level of charge, a request for air conditioning being received, operator torque demand being higher than a threshold amount, etc. If engine restart conditions are not met, the engine may be maintained shutdown and the vehicle may continue to be propelled via the motor. Else, at 432, in response to restart conditions being met, the engine may be restarted and engine fueling may be resumed. Herein, upon restarting the engine, EGR may be enabled and higher EGR flow rates may be achieved since the engine was already purged.

Returning to 411, if the battery SOC is lower than the threshold charge, then it may be determined that the battery is capable of accepting further charge. Consequently, EGR purging may be enabled by transiently operating the vehicle in a generating mode. Specifically, at 422, the routine includes disabling EGR in response to the decreasing engine load conditions. Disabling EGR includes closing an EGR valve coupled in an LP-EGR passage to disable further recirculation of exhaust residuals from the exhaust manifold, downstream of the turbine, to the intake manifold, upstream of the compressor.

At 424, the routine includes operating the engine with EGR disabled and with engine output torque higher than demanded torque. That is, until EGR in the engine intake is sufficiently purged, the engine may continue to be spun fueled with engine output torque generated in excess of torque demanded for vehicle propulsion. By operating the engine fueled with the EGR valve closed, fresh intake air drawn into the air induction system may replace the intake EGR, expediting EGR purging. In one example, the engine is operated fueled with the EGR valve closed for 1-3 seconds.

Also at 424, the routine includes charging the system battery with the excess engine output torque. That is, the system battery is charged with engine output torque, in excess of demanded torque, generated during engine operation with EGR disabled. Charging the battery may include operating the generator using the excess engine output torque, the generator coupled to the battery. In one example, the engine is operated in the generating mode for 1-3 seconds.

Operating the engine with engine output torque higher than demanded includes operating the engine at an engine speed that is based on one or more of a state of charge of the system battery and an EGR level of the engine intake at a time of the decreasing engine torque demand condition. For example, the engine speed may be based on a charge accepting ability of the battery. Thus, as a difference between the battery SOC and the threshold charge increases (and thereby the charge accepting capability of the battery increases), the engine speed at which the engine is operated may be increased. The engine speed may also be based on the EGR level in the intake at the time of an operator pedal tip-out. For example, as the EGR level at tip-out increases, more purging may be required, and consequently the engine speed may be increased. In still further examples, the engine speed may be further adjusted based on vehicle speed.

At 426, as at 416, it may be determined if the LP-EGR has been sufficiently purged from the engine intake manifold. For example, it may be determined if EGR (flow, amount, concentration, level, etc.) in the intake is lower than the threshold. The threshold may be based on the EGR tolerance of the engine at low engine load conditions.

If the LP-EGR is not lower than the threshold, then the controller may continue to operate the engine fueled, with EGR disabled and with excess engine torque generated, and with the excess torque stored as charge in a system battery, until the EGR is sufficiently purged. At 428, when EGR in the intake is less than the threshold, the routine includes deactivating fuel to the engine and spinning the down the engine to rest. Thereafter the engine may be maintained shutdown until engine restart conditions are met. In the meantime, the vehicle may be propelled using motor torque from the motor/generator. As such, this allows the LP-EGR rate to be reset (for example, to zero) such that when the engine is restarted, a known, higher LP-EGR rate can be realized to improve engine efficiency in the key medium load region of the speed-load map.

From 428, the routine proceeds to 430 to determine if engine restart conditions are met, and restart the engine at 432 if conditions are met. Upon restarting the engine, EGR may be enabled and higher EGR flow rates may be achieved since the engine was already purged.

In this way, at 422-428, during a tip-out from operating an engine with EGR flowing, while a battery state of charge is lower than a threshold charge, a battery may be charged by operating the engine with EGR disabled until an engine intake EGR level is lower than a threshold, the engine operated to generate more torque than demanded. Herein, operating the engine with EGR flowing includes operating the engine with an EGR valve, coupled in a low pressure EGR passage, open (e.g., fully open) and operating the engine with EGR disabled includes operating with the EGR valve closed (e.g., fully closed). Once the engine intake EGR level is lower than the threshold, engine operation and battery charging may be discontinued.

It will be appreciated that while the routine of FIG. 4 shows selecting between purging LP-EGR in a hybrid vehicle system by spinning an engine unfueled via a generator or operating an engine fueled with EGR disabled and with a battery being charged based on a charge accepting capability (or SOC) of a system battery, in alternate examples, the controller may be configured to select based on the LP-EGR level in the engine intake during the decreasing engine load/torque demand conditions. For example, if the LP-EGR level at a time of operator pedal tip-out is higher, the controller may select purging by spinning the engine unfueled via the generator. Else, if the LP-EGR level at the time of operator pedal tip-out is lower, the controller may select purging by operating the engine fueled in a generating mode with EGR disabled. Further still, in some examples, the controller may be configured to select spinning the engine unfueled via the generator as the default purging option. The controller may then selectively override the default purging option with the generating mode purging option based on operator input.

It will be appreciated that while the routine of FIG. 4 depicts EGR purging in response to decreasing engine load/torque demand (such as due to an operator tip-out), in alternate examples, the EGR purging may be initiated in anticipation of an engine shutdown. For example, based on vehicle operating conditions, the vehicle controller may determine an imminent an engine shutdown and may start the EGR purging before the anticipated engine shutdown occurs. Herein, the EGR purging may be performed independent of the operator input, for example, independent of the operator pedal tip-out event or driver demand. Rather, the EGR purging may be performed based on vehicle operating conditions (e.g., vehicle speed, ambient humidity, etc.) which may determine a frequency of engine shutdown and restart. By initiating the EGR purging in anticipation of an engine shutdown, additional purge delays are reduced.

In this way, LP-EGR can be rapidly purged and EGR levels can be reset during decreasing engine torque demand conditions. The rapid purging reduces combustion stability risks associated with lingering EGR at low load conditions.

In addition, the resetting of EGR levels allows higher EGR rates to be realized during increasing engine torque demand to medium load conditions.

In one example, a hybrid vehicle system comprises an engine including an intake and an exhaust; an intake throttle; an electric motor/generator coupled to a battery; and vehicle wheels propelled using torque from one or more of the engine and the motor. The hybrid vehicle system further includes a direct fuel injector coupled to an engine cylinder; a turbocharger including an intake compressor driven by an exhaust turbine; and an EGR passage for flowing EGR from the exhaust, downstream of the turbine, to the intake, upstream of the compressor, via an EGR valve. The vehicle system may include a controller with computer readable instructions for, during a tip-out from operating the engine with EGR flowing, disabling the fuel injector; fully opening each of the EGR valve and the intake throttle; and using torque from the motor to meet an operator torque demand and spin the engine unfueled, the engine spinning continued for a duration until EGR in the engine is lower than a threshold. Herein, spinning until LP-EGR in the engine is lower than a threshold includes spinning until an amount of LP-EGR in an intake manifold of the engine is lower than the threshold, the threshold based on the torque demand. In one example, spinning until LP-EGR in the engine is lower than a threshold includes spinning until LP-EGR flow is at zero flow. Spinning the engine includes spinning the engine at an engine speed at or above an engine cranking speed. The controller may include further instructions for, after the duration, spinning the engine to rest and maintaining the engine shutdown while continuing to use motor torque to meet the torque demand.

In another example, the controller of the above described hybrid vehicle system includes computer readable instructions for, in response to an operator pedal tip-out while operating the engine with EGR flowing, estimating a battery state of charge; and if the estimated battery state of charge is lower than a threshold charge, closing the EGR valve; operating the engine with the EGR valve closed for a duration until EGR in the engine is lower than a threshold, the engine operated to generate more torque than demanded; and charging the battery with excess engine torque generated while operating the engine with the EGR valve closed. Herein, operating the engine with the EGR valve closed may include spinning the engine at an engine speed based on one or more of the battery state of charge at the tip-out and an intake EGR level at the tip-out. Further, operating the engine with the EGR valve closed until EGR in the engine is lower than a threshold may include operating the engine until EGR flow is at zero flow. The controller may include further instructions for, if the estimated battery state of charge is higher than the threshold charge, disabling the fuel injector; fully opening the EGR valve and the intake throttle; and using torque from the generator to meet operator torque demand and spin the engine unfueled until EGR in the engine is lower than the threshold.

Figure 6:
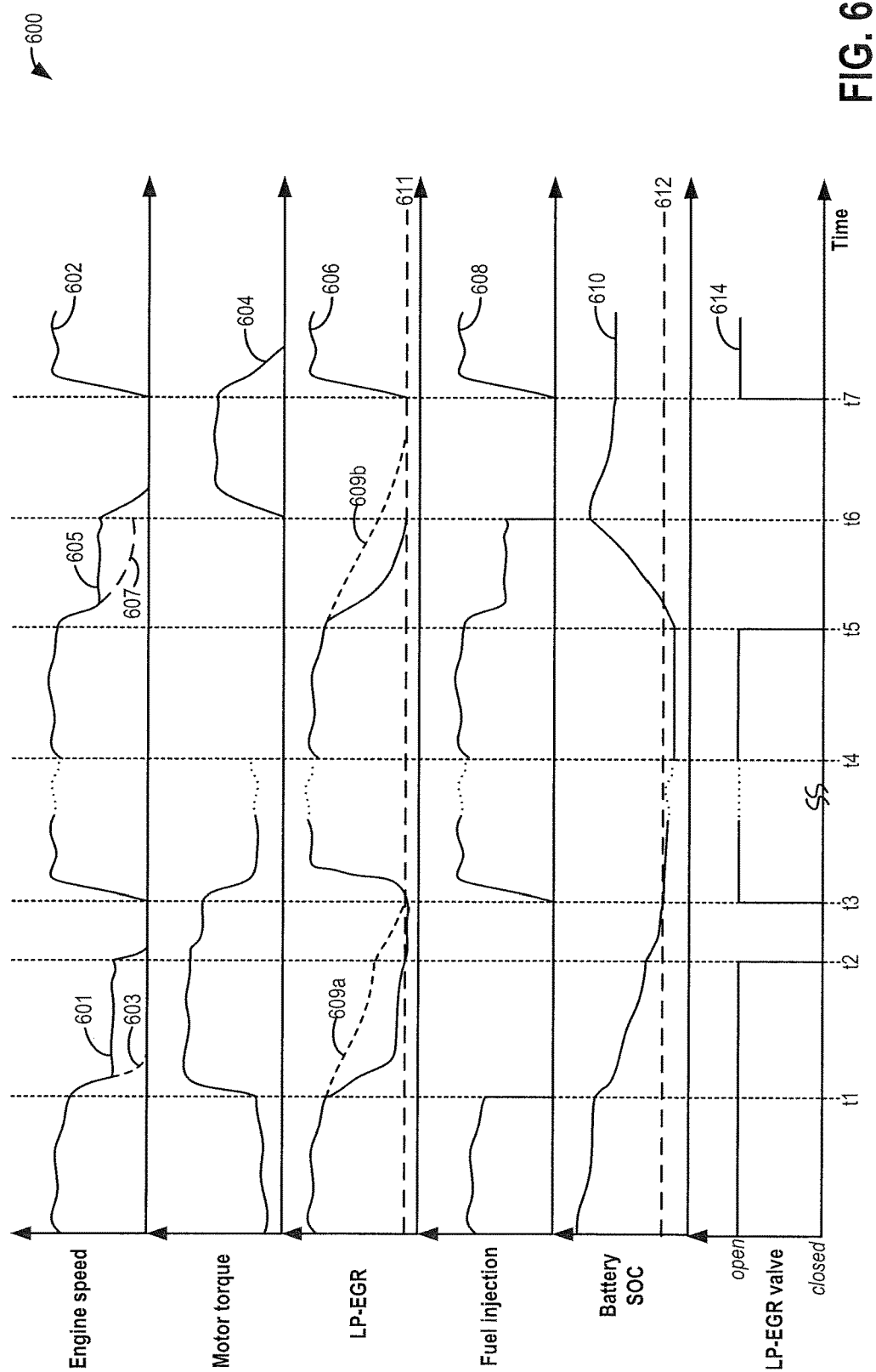
FIG. 6 shows example operations in a hybrid electric vehicle to expedite EGR purging, according to the present disclosure.

Example EGR purging operations are now shown with reference to the example of FIG. 6. Specifically, map 600 depicts engine speed at plot 602, motor torque at plot 604, LP-EGR at plot 606, fuel injection at plot 608, a battery state of charge (SOC) at plot 610, and a position of an LP-EGR valve at plot 614.

Prior to t1, the hybrid vehicle may be operating with a larger portion of wheel torque being provided by the engine and a smaller portion of the wheel torque being provided by the motor. Accordingly, the engine may be spinning fueled (plot 608) with an engine speed corresponding to operation in a medium to higher load region (plot 602) with only some assist from the motor (plot 604). While operating in the medium to higher load region, LP-EGR may be flowing (plot 606), for example, with a flat schedule where EGR is provided at a fixed rate relative to airflow. Specifically, an LP-EGR valve may be open (plot 614). In the depicted example, the LP-EGR valve is shown as an on-off valve that can be shifted between a fully open and a fully closed position. However, in other examples, an opening of the EGR valve may be variably adjusted based on the LP-EGR demand. During the engine operation prior to t1, the battery state of charge may be higher than a threshold 612 and the battery may not be capable of accepting further charge (plot 610).

At t1, an operator pedal tip-out may occur resulting in a decrease in engine load to low load conditions. In response to the decreasing engine torque demand, EGR to the engine may be decreased. As such, if an LP-EGR valve were adjusted (e.g., closed) to decrease the EGR, due to the pre-compressor location of EGR delivery, there may be a large transport delay and EGR may not decrease as fast as desired. For example, EGR may decrease as per the profile of dotted segment 609a. This would result in the presence of excess dilution in the engine intake manifold at low load conditions, increasing the propensity for misfires and combustion stability issues.

To improve the purging of LP-EGR at the low load conditions and enable minimal (e.g., zero flow) EGR to be provided to the engine at the low load conditions, EGR may be rapidly purged using assistance from a system generator. Herein, purging with assistance from the generator may be requested due to the battery state of charge being higher than threshold 612. Specifically, at t1, fuel injection to the engine is disabled, causing a drop in engine speed. In addition, motor/generator output is increased so as to provide sufficient motor torque to propel the vehicle and meet the operator torque demand, while also providing sufficient motor torque to spin the engine unfueled. As such, if the motor/generator were not operated, the engine may spin down to rest, as per the profile of dotted segment 603. While spinning the engine unfueled via the motor/generator, the LP-EGR valve may be kept fully open. In addition, an intake throttle (not shown) may be fully opened. This allows EGR in the air induction system to be replaced with fresh intake air rapidly.

Spinning the engine unfueled includes spinning the engine at an engine speed 601. Engine speed 601 may be a cranking engine speed. Alternatively, engine speed 601 may correspond to engine speed before fuel injector deactivation, or a function thereof. Further still, engine speed 601 may correspond to an engine speed that is most efficient for the engine and the transmission. As such, the engine may be spun via the motor for a duration between t1 and t2 until the LP-EGR is sufficiently purged. For example, the engine may be spun at engine speed 601 until LP-EGR is at or below a minimum EGR level 611. In an alternate example, EGR level 611 may include no EGR flow such that no LP-EGR is provided at lower engine load conditions.

At t2, once the EGR is sufficiently purged, the engine is allowed to stop. In addition, the LP-EGR valve is closed. Thereafter, the engine is maintained shutdown until restart conditions are met (at t3). In the meantime, between t2 and t3, motor operation may be adjusted so that enough motor torque is produced to propel the vehicle. Between t1 and t3, when the engine is not running and motor torque is being used to propel the vehicle and/or spin the engine unfueled, the battery SOC may fall. For example, at t3, the battery SOC may drop below threshold 612.

At t3, in response to engine restart conditions (such as due to a rise in operator torque demand), fuel injection to the engine may be reinitiated and engine torque may be increased to propel the vehicle. At the same time, the motor torque may be reduced since the vehicle is propelled largely with engine torque. While the depicted example shows motor torque being reduced to a lower level, in alternate example, use of motor torque may be completely discontinued. Also at t3, the LP-EGR valve is opened to re-enable EGR during engine operation. Further, since LP-EGR was reset at t2, during the restart to higher loads at t3, higher LP-EGR peak rates may be delivered.

Vehicle operation with the engine operating and EGR being delivered may continue until t4. As such, sufficient time may elapse between t3 and t4 (depicted by dotted lines). At t4, the hybrid vehicle may be operating in an engine-only mode with wheel torque demand being met by the engine. The engine may be spinning fueled at an engine speed corresponding to operation in a medium to higher load region, with LP-EGR flowing (and the LP-EGR valve open). For example, LP-EGR may be provided as per a flat schedule with a fixed rate of EGR relative to airflow. During the engine operation at t4, the battery state of charge may be lower than threshold 612 and the battery may be capable of accepting further charge.

At t5, as at t1, an operator pedal tip-out may occur resulting in a decrease in engine load to low load conditions. In response to the decreasing engine load, EGR to the engine may be decreased. Specifically, the LP-EGR valve is closed to decrease the EGR. However, even with EGR valve closing, due to the pre-compressor location of EGR delivery, there may be a large transport delay and EGR may not decrease as fast as desired. For example, EGR may decrease as per the profile of dotted segment 609b. This would result in the presence of excess dilution in the engine intake manifold at low load conditions, increasing the propensity for misfires and combustion stability issues.

To improve the purging of LP-EGR at the low load conditions and enable minimal (e.g., zero flow) EGR to be provided to the engine at the low load conditions, EGR may be rapidly purged by operating the hybrid vehicle system in a generating mode. Herein, purging by operating the engine in a generating mode may be requested due to the battery state of charge being lower than threshold 612 and the battery being able to accept charge. Specifically, at t5, engine fueling and operation is maintained but with EGR disabled. Fuel injection to the engine is adjusted to generate engine torque in excess of what is required to propel the vehicle and meet operator torque demand. In doing so, the engine is operated at a higher speed 605 than would have otherwise been required (as shown by dashed segment 607) to propel the vehicle. By operating the engine at a higher speed with the EGR valve closed, EGR in the air induction system can be rapidly replaced with fresh intake air, allowing for faster EGR purging. The excess torque generated by the engine is then used to charge the battery. Consequently, the battery state of charge may start to rise after t5.

Operating the engine to generate excess torque includes spinning the engine at an engine speed 605. Engine speed 605 may be based on the LP-EGR level at the time of tip-out (at t5) as well as the battery SOC at the time of tip-out. As the battery state of charge decreases, a higher engine speed 605 (relative to engine speed 607 that would be otherwise required to propel the vehicle) can be applied and higher levels of excess torque can be generated to purge the EGR since the battery is capable of accepting larger amounts of charge. Likewise, as the LP-EGR level increases, and more purging is required, engine speed 605 can be raised further relative to engine speed 607.

The engine is operated with EGR disabled and excess engine torque generated for a duration between t5 and t6 until the LP-EGR is sufficiently purged. For example, the engine may continue be operated at engine speed 605 until LP-EGR is at or below minimum EGR level 611. In an alternate example, EGR level 611 may include no EGR flow such that no LP-EGR is provided at lower engine load conditions. Also between t5 and t6, the battery state of charge may continue to increase until it is higher than threshold 612 by t6.

At t6, once the EGR is sufficiently purged, the engine is allowed to stop. Specifically, engine fueling is disabled and the engine is allowed to spin to rest. Thereafter, the engine is maintained shutdown until restart conditions are met (at t7). In the meantime, between t6 and t7, a motor of the vehicle system is operated to generate sufficient motor torque to propel the vehicle.

At t7, in response to engine restart conditions (such as due to a rise in operator torque demand), fuel injection to the engine may be reinitiated and engine torque may be increased to propel the vehicle. At the same time, the motor torque may be reduced (e.g., discontinued) such that the vehicle is propelled with engine torque. Further, since LP-EGR was reset at t6, during the restart to higher loads at t7, higher LP-EGR peak rates may be delivered.

In this way, during a first engine shutdown from operating with EGR, a controller may disable fuel injection, and spin the engine unfueled via a motor until the EGR is below a threshold. In comparison, during a second engine shutdown from operating with EGR, the controller may disable EGR, and spin the engine fueled until the EGR is below the threshold while charging a battery with excess engine torque. Herein, during the first engine shutdown, while the engine is spinning unfueled, motor torque is used to propel the vehicle and spin the engine, while during the second engine shutdown, while the engine is spinning fueled, engine torque is used to propel the vehicle and charge the battery. Further, during the first engine shutdown, a state of charge of the battery is above a threshold charge while during the second engine shutdown, the state of the charge of the battery is below the threshold charge. During the first engine shutdown, the engine is spun unfueled at an engine speed based on an engine speed before disabling fuel injection, while during the second engine shutdown, the engine is spun fueled at an engine speed based on EGR level before disabling EGR.

In this way, during selected decreasing engine load/torque demand conditions, motor torque of a hybrid vehicle system can be advantageously used to purge EGR in a low engine load region and improve EGR delivery in medium load regions. By controlling the motor speed to selectively spin the engine after fuel has been shut off, EGR trapped in the boosted volume of the engine can be rapidly purged. During other decreasing engine load conditions, the charge accepting ability of a hybrid vehicle system battery can be advantageously used to purge EGR in a low engine load region. By enabling excess engine torque to be stored in the battery, the engine can be operated at higher engine speeds (and with higher engine outputs) while EGR is disabled, allowing for EGR in the air induction system to be rapidly replaced with fresh air. By expediting purging of the EGR, LP-EGR rates can be reduced faster at low load conditions. For example, LP-EGR rates can be reset at the low load conditions. This reduces the propensity for misfires and combustion instability due to the presence of excess dilution at low load conditions. The expedited purging further allows higher LP-EGR rates to be realized when the engine is restarted. As such, this allows the engine to be used in its highest efficiency operating region. In particular, engine efficiency can be substantially improved in the medium load region. The interaction between the boosted engine and the power-split hybrid application also allows for the fuel economy potential of LP-EGR to be improved and reduces compromises to EGR rates, such as the running of LP-EGR at low load conditions and the lower peak EGR rates achievable at medium to high load conditions when operating with a flat EGR schedule. Overall, vehicle performance and engine fuel economy is improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle, comprising:
in response to decreasing engine load while operating an engine with EGR, determining an EGR amount in an intake, and selecting from among a first method of engine operation and a second method of engine operation based on the determined amount of EGR in the intake,
when the first method is selected, disabling fuel to the engine while using motor torque to propel the vehicle; and
while propelling the vehicle,
with each of an EGR valve and an intake throttle fully open, spinning the engine unfueled via a motor until the EGR amount is less than a threshold; and
when the second method is selected, operating the engine fueled with the EGR valve closed while using additional torque to charge a battery until the determined EGR amount is less than another threshold.

2. The method of claim 1, wherein operating with EGR includes operating with low pressure EGR (LP-EGR) at a fixed rate relative to airflow, the LP-EGR including cooled exhaust residuals recirculated from an exhaust manifold, downstream of an exhaust turbine, to an intake manifold, upstream of an intake compressor.

3. The method of claim 2, wherein the threshold is based on an EGR tolerance of the engine at low engine load conditions, and wherein selecting from among the first method of engine operation and the second method of engine operation based on the determined amount of EGR in the intake comprises selecting the first method of engine operation when the determined amount of EGR in the intake is within a first range of amounts, and selecting the second method when the determined amount of EGR in the intake is within a second range of amounts, lower than the first range of amounts.

4. The method of claim 3, wherein the decreasing engine load is in response to an operator pedal tip-out.

5. The method of claim 4, wherein spinning the engine unfueled via the motor includes deactivating fuel to the engine, and then spinning the engine at a speed based on an engine speed that the engine was spinning at immediately before the deactivating by spinning the engine unfueled via the motor.

6. The method of claim 5, wherein spinning the engine includes operating the motor to spin the engine at the engine speed, the motor operated using electrical energy from the battery.

7. The method of claim 6, further comprising, when EGR is less than the threshold, spinning down the engine, unfueled, to rest via the motor and maintaining engine shutdown.

8. The method of claim 4, wherein spinning the engine unfueled via the motor includes spinning the engine at a cranking speed, the method further comprising, in response to an indication of an operator change of mind, fueling the engine and spinning up the engine from the cranking speed.

9. The method of claim 1, wherein operating the engine with EGR includes operating the engine boosted, with low pressure EGR flowing, and with fuel delivered to the boosted engine via direct injection.

10. The method of claim 1, wherein the second method of operation includes operating the engine with higher torque than required by the engine load, and wherein the engine spins at a speed determined based on vehicle speed.

11. The method of claim 1, wherein the engine spins at a speed based on an EGR level in the intake and a charge of the battery.

12. A method for an engine in a hybrid vehicle, comprising:
during a first engine shutdown from operating with EGR, disabling fuel injection, and with an EGR valve and an intake throttle fully open, spinning the engine unfueled via a motor until a determined EGR amount in an intake is below a threshold while propelling the vehicle using motor torque; and during a second engine shutdown from operating with EGR, closing the EGR valve, spinning the engine fueled to generate engine torque in excess of torque demanded for vehicle propulsion, and propelling the vehicle using engine torque until the determined EGR amount is below the threshold while charging a battery with excess engine torque, wherein the first engine shutdown is selected responsive to a state of charge of the battery being above a threshold charge and wherein the second engine shutdown is selected responsive to the state of the charge of the battery being below the threshold charge.

13. The method of claim 12, further comprising determining the state of charge of the battery and selecting from the first and second engine shutdowns based on the determined state of charge of the battery relative to the threshold charge.

14. The method of claim 12, wherein during the first engine shutdown, the engine is spun unfueled at an engine speed based on an engine speed before disabling fuel injection, and wherein during the second engine shutdown, the engine is spun fueled at an engine speed based on an EGR level before disabling EGR.

15. The method of claim 12, wherein during the first engine shutdown the engine spins at a speed determined based on both the determined amount of EGR in the intake and engine load.

16. The method of claim 12, wherein selection of the first and second engine shutdowns is responsive to an imminent engine shutdown.

17. A hybrid vehicle system, comprising:
an engine including an intake and an exhaust;
an intake throttle;
an electric motor/generator coupled to a battery;
vehicle wheels propelled using torque from one or more of the engine and the electric motor/generator;
a direct fuel injector coupled to an engine cylinder;
a turbocharger including an intake compressor driven by an exhaust turbine;
an EGR passage for flowing EGR from the exhaust, downstream of the turbine, to the intake, upstream of the compressor, via an EGR valve;
a sensor for determining an amount of EGR in the intake; and
a controller with computer readable instructions for:
during a tip-out from operating the engine with EGR flowing,
disabling the fuel injector;
fully opening each of the EGR valve and the intake throttle; and
using torque from the motor to meet an operator torque demand and spin the engine unfueled, the engine spinning continued for a duration while propelling a vehicle using motor torque until the determined amount of EGR in the engine is lower than a threshold, the threshold determined based on the operator torque demand.

18. The system of claim 17, wherein the controller includes instructions for spinning until LP-EGR in the engine is lower than a threshold by spinning the engine unfueled until a determined amount of LP-EGR in the intake is lower than the threshold.

19. The system of claim 17, wherein the controller includes instructions for spinning until LP-EGR in the engine is lower than a threshold by spinning the engine unfueled until LP-EGR flow is determined to be at zero flow.

20. The system of claim 17, wherein the controller includes instructions for spinning the engine unfueled by operating the electric motor/generator via the battery to maintain the engine spinning after disabling the fuel injector at an engine speed that is at or above an engine cranking speed.

* * * * *